(12) United States Patent
Durocher, Jr. et al.

(10) Patent No.: US 12,738,722 B2
(45) Date of Patent: Sep. 15, 2026

(54) LONG SPAN STRAND CLAMP

(71) Applicant: Verizon Patent and Licensing Inc., Basking Ridge, NJ (US)

(72) Inventors: Marc J Durocher, Jr., Auburn, MA (US); Robert R Sheehan, Florham Park, NJ (US); Eugene C Phillips, Philadelphia, PA (US); Shawn C McCourt, Mechanicsburg, PA (US); Erik J Sheehan, Sparta, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 118 days.

(21) Appl. No.: 18/581,268

(22) Filed: Feb. 19, 2024

(65) Prior Publication Data

US 2025/0266670 A1 Aug. 21, 2025

(51) Int. Cl.
*H02G 7/00* (2006.01)
*H02G 7/05* (2006.01)

(52) U.S. Cl.
CPC .................................... *H02G 7/05* (2013.01)

(58) Field of Classification Search
None
See application file for complete search history.

(56) References Cited

U.S. PATENT DOCUMENTS 2,120,828 A * 6/1938 William ................ F16L 3/1033 248/61
3,160,378 A * 12/1964 Goewey ................... H02G 7/08 174/41
3,561,708 A * 2/1971 Dubey ..................... H02G 7/08 248/65
4,383,668 A * 5/1983 Hall ........................ F16G 11/06 174/42
6,174,177 B1 * 1/2001 Auclair .................... H01R 4/66 439/100
10,673,215 B2 * 6/2020 Matsuo ................ H02G 3/0456
2008/0099226 A1 * 5/2008 Goch ..................... H01B 9/008 174/41
2010/0015862 A1 * 1/2010 Gregrory ............. H01R 4/5091 439/783
2018/0301884 A1 * 10/2018 Defrance ................ H02G 7/12
2019/0232816 A1 * 8/2019 Logan .................. H02G 3/0456

* cited by examiner

*Primary Examiner* — Steven M Marsh

(57) ABSTRACT

A clamp for supporting a wire from a strand includes a first clamp portion having a first inner side and a second clamp portion having a second inner side. An opening sized to receive the strand is defined between the first inner side and the second inner side when the first clamp portion is in proximity of the second clamp portion. The first inner side and the second inner side contact the strand when the strand is received within the opening to connect the clamp to the strand. A support portion is attached to the clamp such that the wire is supported from the strand via the clamp. A fastener cooperates with the clamp and is movable from a first position to a second position to inhibit a relative motion between the strand and the clamp.

10 Claims, 12 Drawing Sheets

320
322
124
318
310
310
316
302
310
310
314
308
804
306
304
300

202
124
200

502
504
508
508
508
506
304
500

600
702
304
604
700
602
702
302
124

402
404
408
408
408
406
302
400

124
604
610
600
612
602
608
302
304
608
606

900
906
908
910
912
904
124
310
316
916
914
918
902
606

1000
902
908
906
1004
1006
1002

LONG SPAN STRAND CLAMP

BACKGROUND

Provision of fiber optic cable telecommunication service can include outdoor installation of fiber optic cable between utility poles. In many locations, the fixed spacing distances between consecutive utility poles is greater than a recommended distance between supports for some industry standard fiber optic cables. Adding interstitial utility poles and overlashing procedures designed to reduce the unsupported length of newly installed fiber optic cable are both costly and time-consuming.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
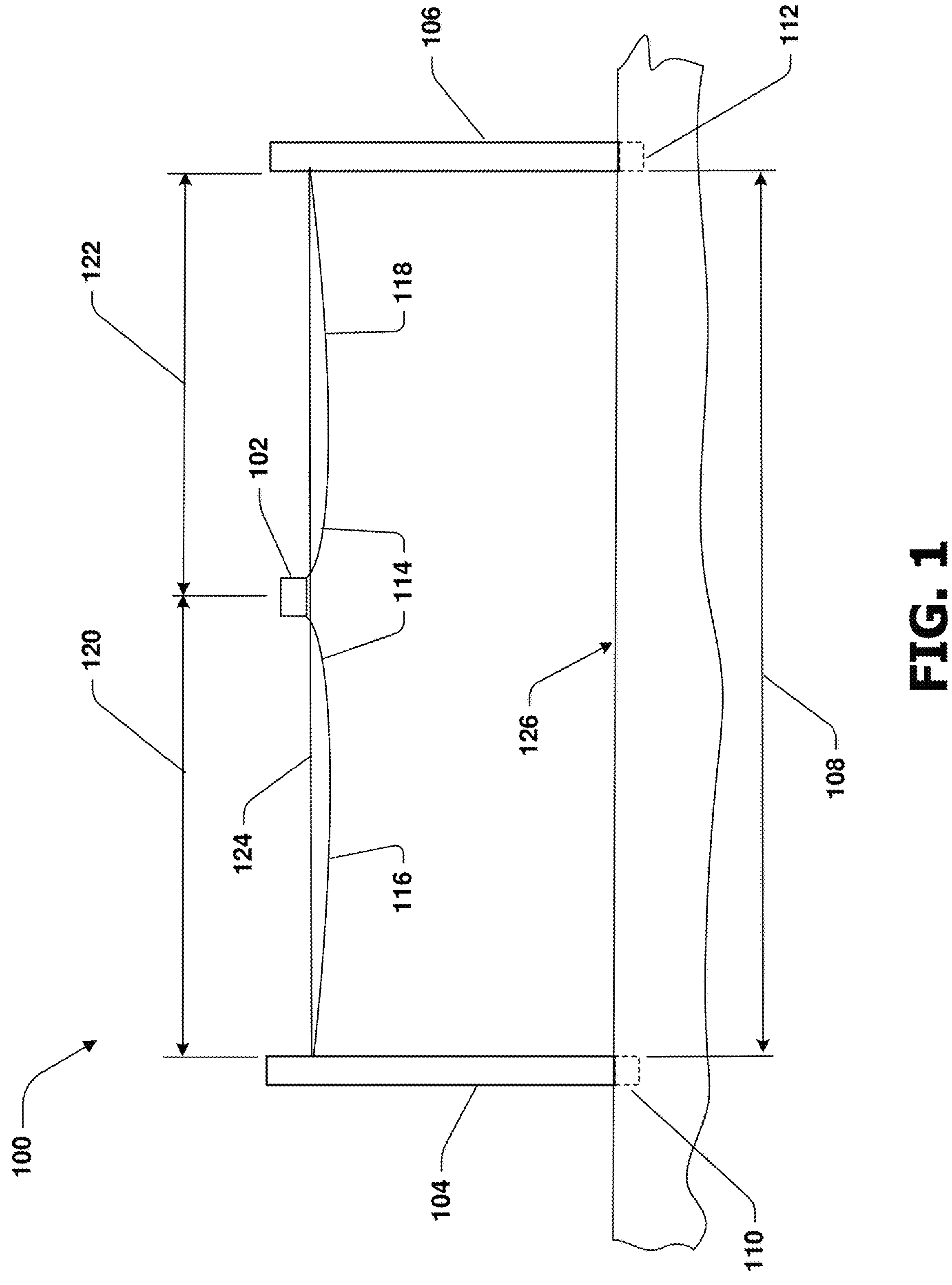
FIG. 1 illustrates an example environment for an exemplary long span strand clamp.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

National Electrical Safety Code (NESC) guidance limits a maximum distance cables and fiber optic wires can span between attachment points. Utility pole separation distances exceed NESC limits in many rural environments where fiber optic cables need to be placed. At least three options are available in instances when fiber optic cables are placed in areas where the existing span between utility poles exceeds NESC maximum distances: first, placement of a new utility pole between existing utility poles in order to reduce the span length; second, installation of a new cable strand and overlashing a fiber optic cable to the new cable strand; and third, overlashing a fiber optic cable over an existing strand and cable. However, these and/or other options have some downside issues. For example, placement of a new utility pole is expensive and requires significant groundwork. Similarly, installation of a new cable strand and overlashing a fiber optic cable to the new cable strand and overlashing a fiber optic cable over an existing strand and cable both require at least some new materials and likely substantial labor hours. The present disclosure describes an additional option including an attachment point on an existing strand already spanning two utility poles. This new option reduces the span length without having to overlash components or place a new utility pole, avoiding expensive operations such as installation of a new pole, installation of new cable strand and even overlashing.

Referring now to the drawings, FIG. 1 illustrates an example environment 100 for an exemplary long span strand clamp system 102. As shown, a first utility pole 104 is separated from a second utility pole 106 by a distance 108. It is to be understood that the first utility pole 104 is at least partially underground at an area 110 and the second utility pole 106 is at least partially underground at an area 112. The area 110 and the area 112 are not meant to be drawn to scale. In some examples, the distance 108 between the first utility pole 104 and the second utility pole 106 is about 400 feet (122 meters). In some rural areas, 400 feet (122 meters) is a commonly found spacing between utility poles. For some examples of a fiber optic cable 114 that must be placed to provide telecommunications services to various geographic areas, the NESC recommends the maximum unsupported span for the cable at 200 feet (about 61 meters). With the distance 108 between utility poles being greater than the NESC recommended unsupported span distance, installers are faced with a choice (as described previously) as to how to satisfy the NESC recommendations.

The long span strand clamp system 102 as described herein can provide a support for the fiber optic cable 114 in order to divide the previously unsupported span 108 approximately in half. In other words, the fiber optic cable 114 can be theoretically divided into a first fiber optic cable section 116 and a second fiber optic cable section 118. The first fiber optic cable section 116 can span a first distance 120 while the second fiber optic cable section 118 can span a second distance 122. In some examples, each of the distance 120 and the distance 122 are roughly half of the distance 108 because a support or attachment point for the fiber optic cable 114 has been added between the first utility pole 104 and the second utility pole 106.

As such, use of the below described long span strand clamp system 102 generally provides a support about mid-way along the distance 108 of about 400 feet (122 meters), which was otherwise unsupported. For example, the distance 108 can generally be bisected into the first distance 120 and the second distance 122, which are each likewise unsupported but are only about 200 feet (about 61 meters) (as opposed to about 400 feet). Note that the schematic representation of FIG. 1 is not intended to be drawn to scale. Location of the long span strand clamp system 102 at a mid-point (or relatively close to the mid-point) of the distance 108 includes attaching a long span strand clamp to a strand 124. In some examples, the strand 124 is a braided steel cable, however, this is not meant to be limiting. The strand 124 can be attached to a cable, where both the strand 124 and the cable have been placed between the first utility pole 104 and the second utility pole 106 at an undetermined time before the desired addition of the fiber optic cable 114 that is featured in this disclosure. The fiber optic cable 114 can also be termed "the wire" 114, and the remainder of the disclosure will use both terms interchangeably.

The first utility pole 104 and the second utility pole 106 can support the fiber optic cable 114, the strand 124, and any number of additional cables, wires, etc. above a ground surface 126. It is to be appreciated that the fiber optic cable 114 is shown only between the first utility pole 104 and the second utility pole 106, however, the fiber optic cable 114 can extend away from the first utility pole 104 to the left of the figure and away from the second utility pole 106 to the right of the figure. The fiber optic cable 114 can extend between and provide a telecommunication connection between network devices and drops that provide telecommunication service(s) to homes, office buildings, apartment buildings, etc. housing customers subscribing to the telecommunication service(s). Additionally, the strand 124 is illustrated as parallel to the ground surface 126, however it is to be understood that some sag of the length of the strand 124 can occur for various reasons. Furthermore, it is to be understood that the ground surface 126 need not be flat, and, indeed, many types of ground surface 126 undulate, have irregular surface features, can be sloped, etc. Despite these irregularities, the disclosure may refer to the strand 124 as being parallel to a ground surface 126.

Figures 2, 3:
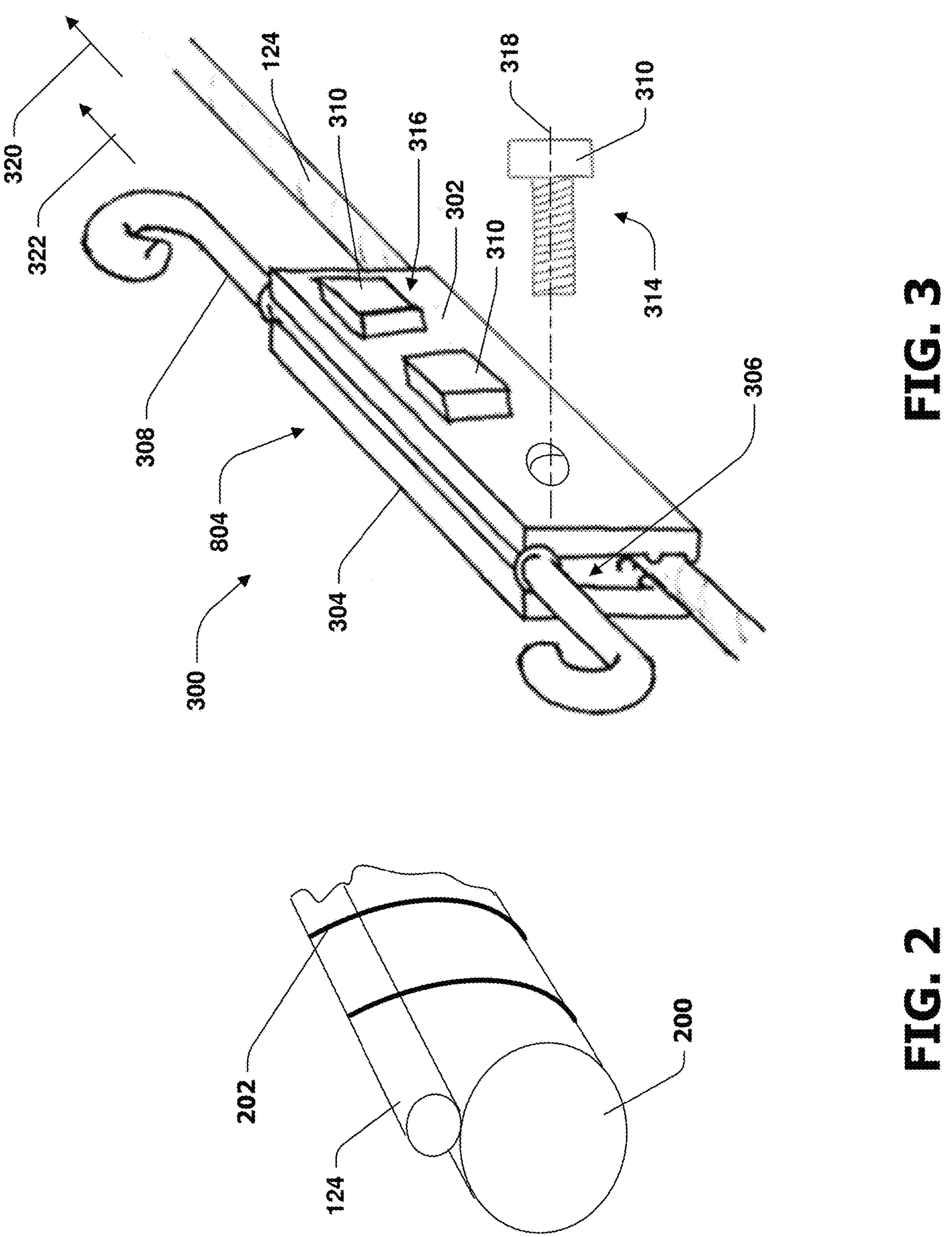
FIG. 2 is an isometric detail view of an example strand overlashed to an example cable from FIG. 1.
FIG. 3 is an isometric detail view of an example long span strand clamp that can be used in the environment shown in FIG. 1.

Referring to FIG. 2, an isometric detail view of a relatively small length of an example strand 124 overlashed to an example cable 200 is illustrated. The strand 124 is located at a top surface of the cable 200 and the strand 124 is overlashed to the cable 200. In some examples, the cable 200 is a copper cable placed between the first utility pole 104 (shown in FIG. 1) and the second utility pole 106 (shown in FIG. 1) prior to the desired placement of the fiber optic cable 114. The process and materials of the overlashing procedure are known and most details will not be reviewed here in the interest of brevity. Suffice to say that the strand 124 is overlashed with a flexible and strong material 202. The material 202 overlashes by providing a helical wrap around both the strand 124 and the cable 200 to provide a force in a radially inward direction to attach and secure the strand 124 to the cable 200. In some examples, the material 202 includes a steel alloy. The overlashing process often requires a lengthy time to complete, can be costly, and inhibits future reclamation of components of the cable 200, such as copper wire. The techniques described herein can thus mitigate, among other things, time and/or costs associated with such overlashing, and may also allow for easier reclamation of material(s). The shown combination of the strand 124 and the cable 200 is understood to be in place and strung between existing utility poles prior to the installation of the fiber optic cable 114 (shown in FIG. 1). The long span strand clamp system 102 as described can cooperate with the strand 124 and/or the cable 200 to provide a support or attachment point for the fiber optic cable 114 reduce to reduce the unsupported span length (e.g., distance 108 shown in FIG. 1) without having to overlash or place a new utility pole.

Referring to FIG. 3, an isometric detail view of an example long span strand clamp 300 that can be used in the environment shown in FIG. 1 is illustrated. The long span strand clamp 300 can support the wire 114 (not shown) from the strand 124. The long span strand clamp 300 includes a first clamp portion 302 and a second clamp portion 304. The first clamp portion 302 and a second clamp portion 304 define an opening 306 that is sized to receive the strand 124. The first clamp portion 302 and/or the second clamp portion 304 can be configured, dimensioned, etc. to achieve a desired sizing of the opening 306. The long span strand clamp 300 includes a support portion 308 that supports the wire 114 and the support portion 308 attaches to at least one of the first clamp portion 302 or the second clamp portion 304 such that the wire 114 is supported from the strand 124 via the long span strand clamp 300. The structures and methods by which the wire 114 is supported by the support portion 308 will be discussed below.

The long span strand clamp 300 includes a fastener 310 configured to cooperate with the first clamp portion 302 and the second clamp portion 304. FIG. 3 shows the long span strand clamp cooperating with three fasteners 310, however, any suitable number of fasteners 310 can be used in the present disclosure. Any one or more of the fasteners 310 can comprise any article(s) to achieve the desired fastening function, such as, for example, screw(s), nut(s), bolt(s), etc. As shown, the fastener 310 is movable from a first position 314 to a second position 316 shown with a different fastener 310. Conceptually, the first position 314 of the fastener 310 occurs when the fastener 310 is partially or wholly unthreaded from a nut (complete separation is not required) to facilitate relative motion between the strand 124 and the first clamp portion 302 or the second clamp portion 304. The second position 316 of the fastener 310 occurs when the bolt is snug with the nut to apply a compression force between the first clamp portion 302 and the second clamp portion 304 in a direction parallel with the fastener axis 318. The fastener 310 is shown as a threaded connector (e.g., a screw, bolt, etc. mating with an unseen nut on the reverse side of the long span strand clamp 300), however, as alluded to above any suitable fastening arrangement can be used with the present disclosure.

Figures 4, 5, 6, 7:
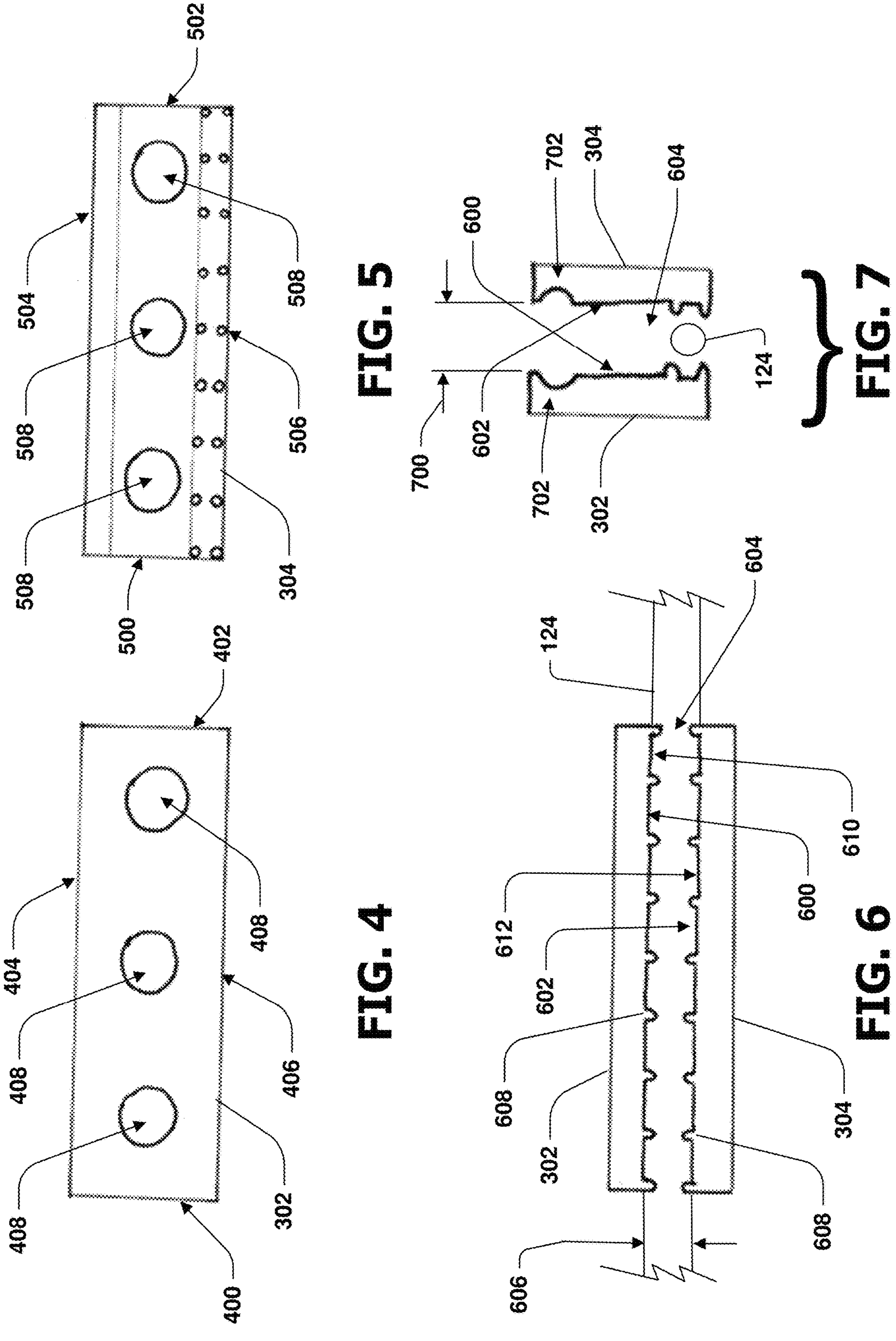
FIG. 4 is an orthographic view of a first clamp portion of the long span strand clamp of FIG. 3.
FIG. 5 is an orthographic view of a second clamp portion of the long span strand clamp of FIG. 3.
FIG. 6 is an orthographic view of the first clamp portion and the second clamp portion of the long span strand clamp of FIG. 3.
FIG. 7 is an orthographic view of the first clamp portion and the second clamp portion of the long span strand clamp of FIG. 3.

Referring to FIG. 4, an orthographic view of the first clamp portion 302 of the long span strand clamp 300 is illustrated. This view is shown from an exterior side of the long span strand clamp 300, such as a side opposite the side that contacts the strand 124 as shown in FIG. 3. The first clamp portion 302 can extend from a first end 400 to an opposing second end 402. The first clamp portion 302 can have a top surface 404 and a bottom surface 406 and define an aperture 408 configured to cooperate with the fastener 310 (shown in FIG. 3).

Referring to FIG. 5, an orthographic view of the second clamp portion 304 of the long span strand clamp 300 is illustrated, wherein teeth, nubs, etc. (discussed below) may be implemented to facilitate gripping, holding, etc. This view is shown from an interior side of the long span strand clamp 300, such as a side that contacts the strand 124 as shown in FIG. 3. The second clamp portion 304 can extend from a first end 500 to an opposing second end 502. The second clamp portion 304 can have a top surface 504 and a bottom surface 506 and define an aperture 508 configured to cooperate with the fastener 310 (shown in FIG. 3). It is to be appreciated that when the first clamp portion 302 and the second clamp portion 304 of the long span strand clamp 300 are paired together, a central axis of the aperture 408 is collinear with a central axis of the aperture 508 such that the fastener axis 318 (shown in FIG. 3) is collinear with both central axes, and the fastener 310 passes through and cooperates with the first clamp portion 302 and the second clamp portion 304. Additionally, while not required, the first clamp portion 302 can be identical to the second clamp portion 304.

Referring to FIGS. 6 and 7, FIG. 6 is a bottom orthographic view while FIG. 7 is a side orthographic view of the first clamp portion 302 and the second clamp portion 304 of the long span strand clamp 300. The first clamp portion 302 has a first inner side 600 while the second clamp portion 304 has a second inner side 602. When the long span strand clamp 300 is assembled, the first clamp portion 302 and the second clamp portion 304 are in proximity to each other such that the first inner side 600 faces the second inner side 602. An opening 604 is sized to receive the strand 124 and is defined between the first inner side 600 and the second inner side 602 when the first clamp portion 302 is in proximity of the second clamp portion 304. In some examples, the opening 604 is the same as the opening 306.

Turning to FIG. 7, when the fastener 310 is in the first position 314 (shown in FIG. 3), the first inner side 600 is separated from the second inner side 602 by a first distance 700 to facilitate relative motion between the strand 124 and at least one of the first clamp portion 302 or the second clamp portion 304. When the fastener 310 is in the first position 314, the long span strand clamp 300 can be placed over the strand 124 because the first distance 700 is greater than a diameter of the strand 124.

In the shown example, a second opening 702 is sized to receive the support portion 308. The second opening 702 is defined between the first inner side 600 and the second inner side 602 when the first clamp portion 302 is in proximity of the second clamp portion 304. The support portion 308 extends in a second direction 322 different than the first direction 320 when the support portion 308 is received within the second opening 702.

Returning to FIG. 6, when the fastener 310 is in the second position 316 (shown in FIG. 3), the first inner side 600 is separated from the second inner side 602 by a second distance 606 that is less than the first distance 700. In some examples, the second distance 606 is about equal to a diameter of the strand 124. In some examples, the second distance 606 is less than the diameter of the strand 124. Regardless of the relationship of the second distance 606 to the diameter of the strand 124, when the fastener 310 is in the second position 316, the first clamp portion 302 and the second clamp portion 304 apply a force to the strand 124 to inhibit the relative motion between the strand 124 and at least one of the first clamp portion 302 or the second clamp portion 304. In other words, moving the fastener 310 (or any other suitable structure) from the first position 314 to the second position 316 secures the long span strand clamp 300 to the strand 124. In some examples, the first inner side 600 and the second inner side 602 contact the strand 124 when the strand 124 is received within the opening 604 to connect or firmly attach the long span strand clamp 300 to the strand 124.

In some examples, at least one of the first inner side 600 or the second inner side 602 includes a non-uniform surface. The non-uniform surface, such as nubs or teeth 608 configured to limit the relative motion between the strand 124 and at least one of the first clamp portion 302 or the second clamp portion 304. While many arrangements and types of non-uniform surface are suitable, FIG. 6 shows but one example of arrangements, namely, a two-row layout of teeth 608 spaced such that the strand 124 can be placed between the rows of teeth 608 and limit the movement of the strand 124. An elevation view of the rows of teeth 608 can be seen in FIG. 5.

Remaining with FIG. 6, in some examples, the opening 604 is at least partially defined in a first flat surface 610 of the first inner side 600 such that the first flat surface 610 contacts the strand 124 when the strand 124 is received within the opening 604. In some examples, the opening 604 is at least partially defined in a second flat surface 612 of the second inner side 602 such that the second flat surface 612 contacts the strand 124 when the strand 124 is received within the opening 604.

Returning to FIG. 3, in some examples, the strand 124 extends in a first direction 320 when the strand 124 is received within the opening 604. Additionally, the support portion 308 extends away from at least one of the first clamp portion 302 or the second clamp portion 304 in a second direction 322 parallel to the first direction 320.

Figure 8:
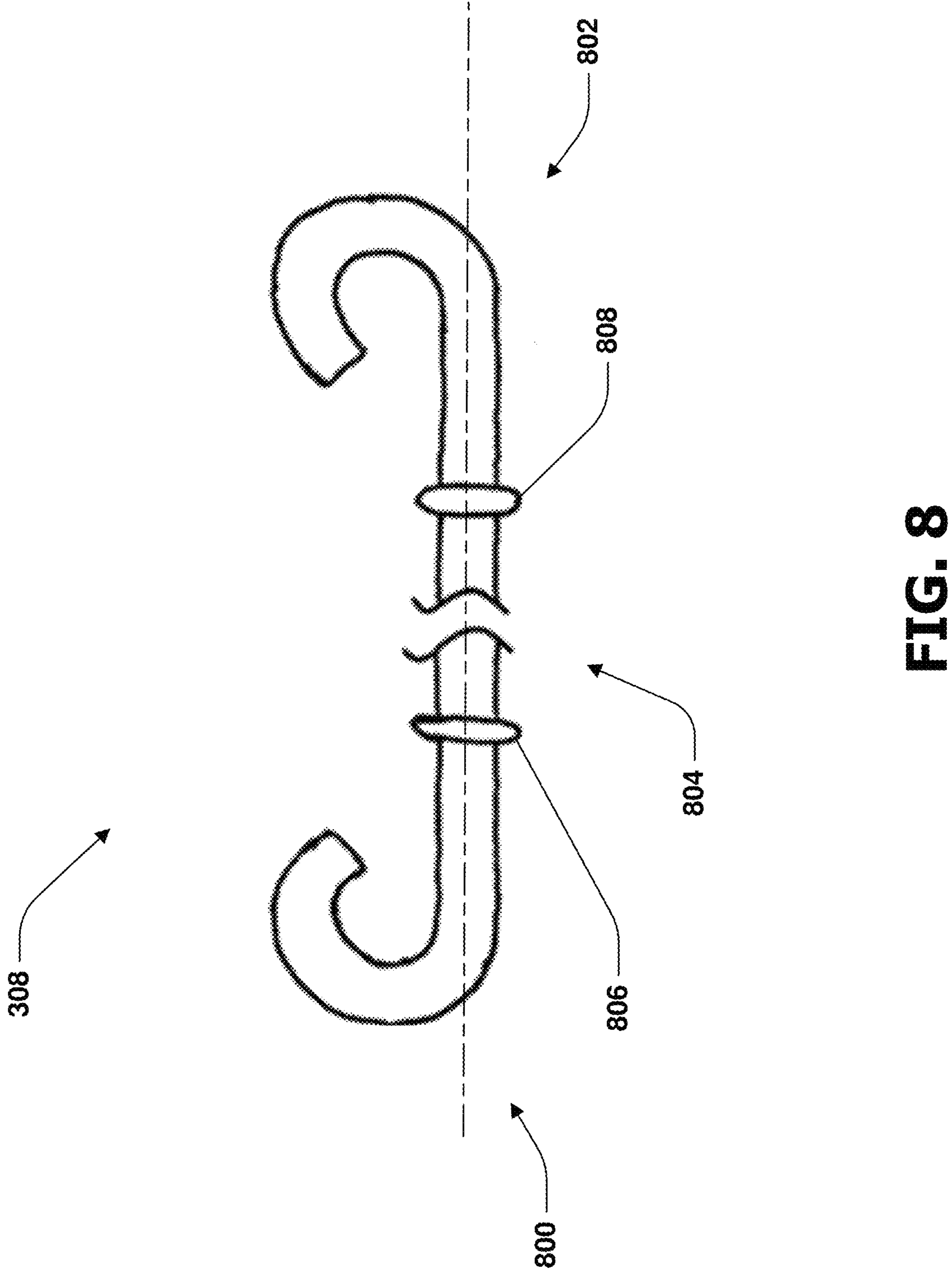
FIG. 8 is an orthographic detail view of a support portion of the long span strand clamp of FIG. 3.

Turning to FIG. 8, an orthographic detail view of the support portion 308 of the long span strand clamp 300 is illustrated. The support portion 308 can extend from a first end 800 to a second end 802 and include a relatively straight central portion 804 configured to cooperate with at least one of the first clamp portion 302 or the second clamp portion 304. Either of the first end 800 or the second end 802 can be curved or curled as shown to cooperate with a wire clamp or a self-supporting clamp portion (e.g., a lanyard attachment of a self-supporting clamp) as will be described below. In some examples, at least one of the curved first end 800 or the curved second end 802 can be rotated about a central axis of the central portion 804 such that at least one of the first end 800 or the second end 802 extend into the page of FIG. 8 or out of the page of FIG. 8.

The support portion 308 can also include a first collar 806 and a second collar 808 located on either side of the central portion 804. The first collar 806 and the second collar 808 can contact at least one of the first end 400 of the first clamp portion 302, the second end 402 of the first clamp portion 302, the first end 500 of the second clamp portion 304, or the second end 502 of the second clamp portion 304. This contact helps reduce and/or eliminate movement of the support portion 308 relative to the first clamp portion 302 and relative to the second clamp portion 304. The length of the central portion 804 can be selected to cooperate with a first clamp portion 302 having a particular length between the first end 400 and the second end 402. The ability to use support portions 308 having central portions 804 of varying lengths enables some modular construction/assembly possibilities for the long span strand clamp 300. Other structures (e.g., first clamp portion 302) can be mixed and matched to best fit myriad field conditions as encountered by installers, linemen, etc. during fiber optic cable 114 or wire 114 installation.

Returning to FIG. 3, in some examples, the central portion 804 of the support portion 308 is located between the first clamp portion 302 and the second clamp portion 304 such that when the fastener 310 is in the second position 316 at least one of the first clamp portion 302 or the second clamp portion 304 apply a force to the central portion 804 of the support portion 308 to inhibit relative motion between the support portion 308 and at least one of the first clamp portion 302 or the second clamp portion 304.

Figures 9, 10:
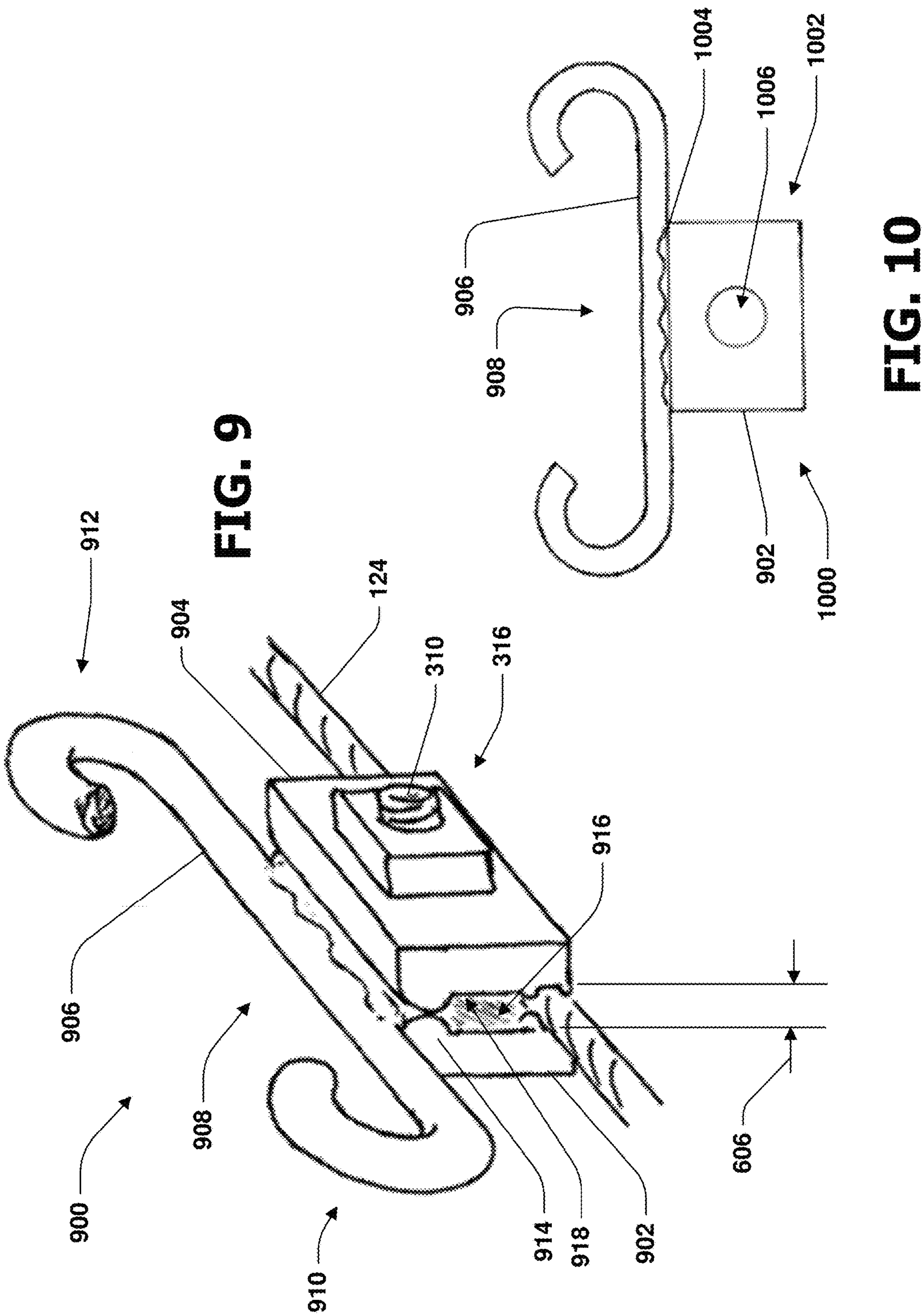
FIG. 9 is an isometric detail view of another example long span strand clamp that can be used in the environment shown in FIG. 1.
FIG. 10 is an orthographic view of a first clamp portion of the long span strand clamp of FIG. 9.

Referring to FIG. 9, an isometric detail view of another example long span strand clamp 900 that can be used in the example environment 100 shown in FIG. 1 is illustrated. As shown, the long span strand clamp 900 includes a first clamp portion 902, a second clamp portion 904, and a support portion 906 having a central portion 908. In this exemplary long span strand clamp 900, the support portion 906 is fixedly attached to at least one of the first clamp portion 902 or the second clamp portion 904. The fixed attachment tends to inhibit disengagement of the support portion 906 from the first clamp portion 902 or the second clamp portion 904. In the shown example, the first clamp portion 902 is welded to the support portion 906 at the central portion 908. Of course, other attachment methods and structures may be suitable. Additionally, the fixed attachment of the support portion 906 to at least one of the first clamp portion 902 or the second clamp portion 904 can reduce the number of individual parts required to assemble the long span strand clamp 900 in the field, which may provide certain benefits.

The long span strand clamp 900 includes a fastener 310 configured to cooperate with the first clamp portion 902 and the second clamp portion 904. FIG. 9 shows the long span strand clamp cooperating with one fastener 310, however, other numbers and positions of fasteners 310 are contemplated. As discussed previously, this additional example of a long span strand clamp can provide greater flexibility for installers/linemen to install fiber optic cable 114 or wire 114 in various situations. As with previous examples, the support portion 906 can include a curved first end 910 and a curved second end 912 configured to cooperate with other devices used in the fiber optic cable 114 distribution network as will be described below.

Remaining with FIG. 9, at least one of the first clamp portion 902 or the second clamp portion 904 include a ridge 914 extending away from at least one of the first inner side 916 or the second inner side 918. The ridge 914 is configured to limit a variation of an angle measured between the first inner side 916 and the second inner side 918 when the fastener 310 is in the second position 316. In some examples, it may be beneficial to maintain the first inner side 916 parallel or approximately parallel to the second inner side 918 when the fastener 310 is in the second position 316. It is to be understood that the first position of the fastener 310, while not shown in FIG. 9, is similar to or the same as the first position 314 shown in FIG. 3.

Referring to FIG. 10, an orthographic view of the first clamp portion 902 of the long span strand clamp 900 is illustrated. As shown, the first clamp portion 902 can extend from a first end 1000 to a second end 1002. A measured distance (e.g., a length) between the first end 1000 and the second end 1002 can be less than the distance of the previous example(s). The first clamp portion 902 is fixedly attached to the support portion 906 at the central portion 908 with a weld material 1004. The first clamp portion 902 can define an aperture 1006 configured to cooperate with the fastener 310 (shown in FIG. 9).

Figures 11, 12:
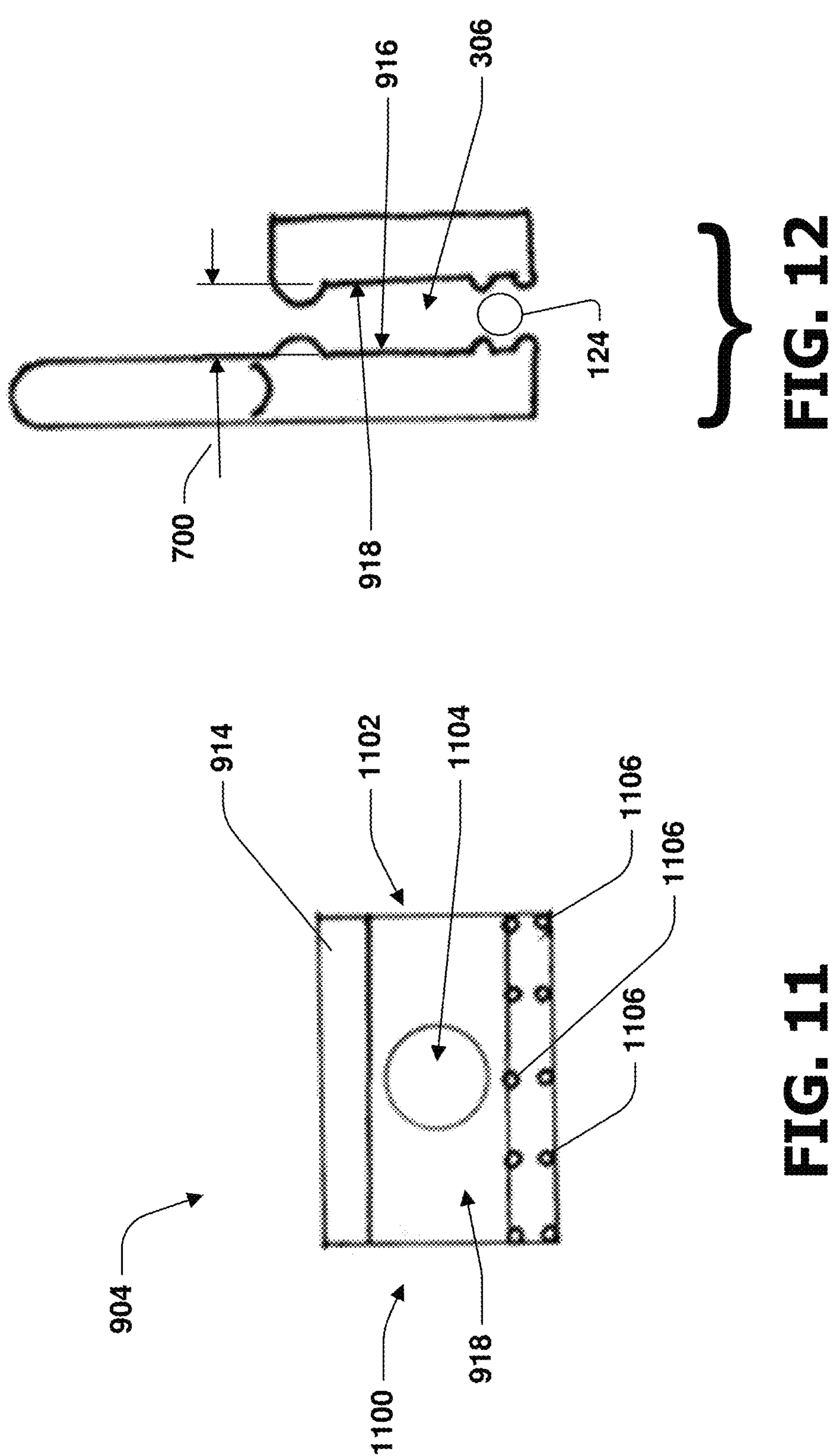
FIG. 11 is an orthographic view of a second clamp portion of the long span strand clamp of FIG. 9.
FIG. 12 is an orthographic view of the first clamp portion and the second clamp portion of the long span strand clamp of FIG. 9.

Referring to FIG. 11, an orthographic view of a second clamp portion 904 of the long span strand clamp 900 is illustrated. The second clamp portion 904 can extend from a first end 1100 to a second end 1102. A measured distance (e.g., a length) between the first end 1100 and the second end 1102 can be equal to the distance between the first end 1000 and the second end 1002 of the first clamp portion 902. The second clamp portion 904 can include a ridge 914 extending away from the second inner side 918. The ridge 914 is configured to cooperate with the ridge 914 of the first clamp portion 902 to limit a variation of an angle measured between the first inner side 916 and the second inner side 918 when the fastener 310 is in the second position 316 (shown in FIG. 9).

The second clamp portion 904 can define an aperture 1104 configured to cooperate with the fastener 310 (shown in FIG. 9). It is to be appreciated that when the first clamp portion 902 and the second clamp portion 904 of the long span strand clamp 900 are paired together, a central axis of the aperture 1006 is collinear with a central axis of the aperture 1104 such that a fastener axis is collinear with both central axes, and the fastener 310 passes through and cooperates with the first clamp portion 902 and the second clamp portion 904. In some examples, the second inner side 918 includes a non-uniform surface. The non-uniform surface, such as nubs or teeth 1106 configured to limit the relative motion between the strand 124 and at least one of the first clamp portion 902 or the second clamp portion 904.

Referring to FIG. 12, an orthographic view of the first clamp portion 902 and the second clamp portion 904 of the long span strand clamp 900 is illustrated. When the fastener 310 is in the first position, the first inner side 916 is separated from the second inner side 918 by a first distance 700 to facilitate relative motion between the strand 124 and at least one of the first clamp portion 902 or the second clamp portion 904. When the fastener 310 is in the first position, the long span strand clamp 900 can be placed over the strand 124 because the first distance 700 is greater than a diameter of the strand 124. When the fastener 310 is in the second position 316 (shown in FIG. 9), the first inner side 916 is separated from the second inner side 918 by a second distance 606 that is less than the first distance 700. In some examples, the second distance 606 is about equal to the diameter of the strand 124. In some examples, the second distance 606 is less than the diameter of the strand 124.

Figure 13:
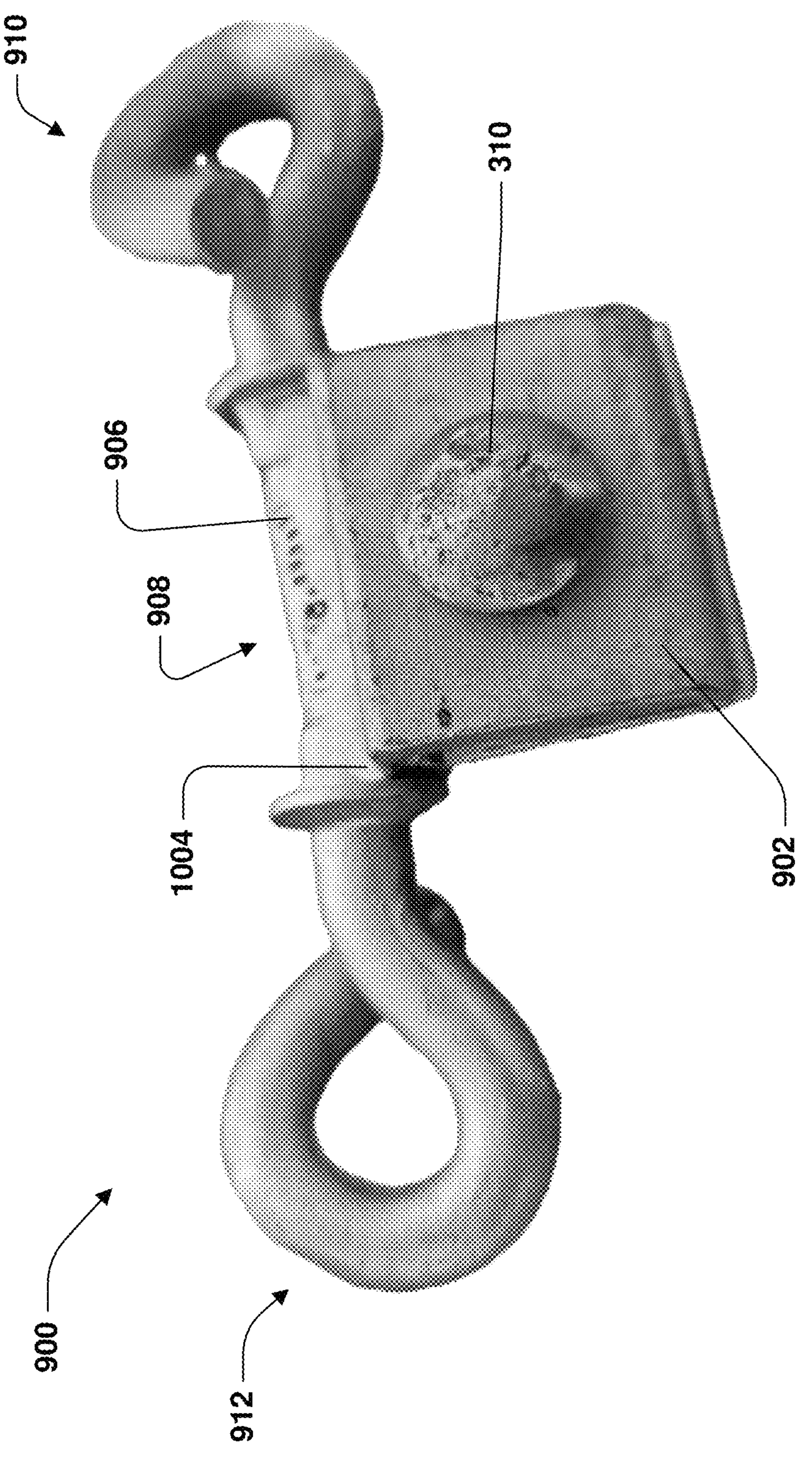
FIG. 13 is another view of the clamp illustrated in FIGS. 9-12.

FIG. 13 is another view of the clamp illustrated in FIGS. 9-12 with the fastener 310 associated with at least the first clamp portion 902.

Figures 14, 15:
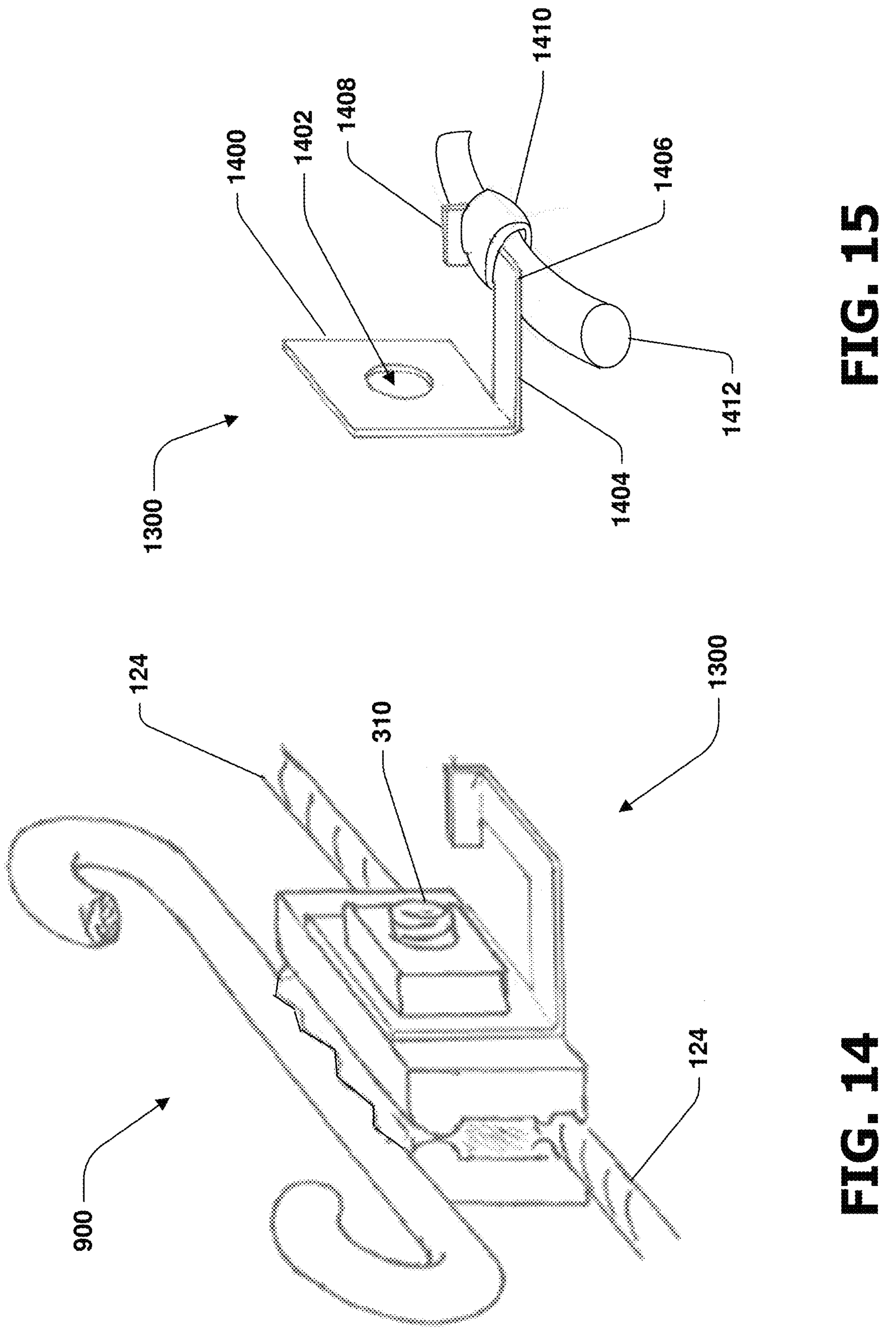
FIG. 14 is similar to FIG. 9, showing a tie attachment mounted to the long span strand clamp.
FIG. 15 is an isometric detail view of the tie attachment of FIG. 14.

Referring to FIGS. 14 and 15, a tie attachment 1300 is shown mounted or attached to the long span strand clamp 900 and shown separate from the long span strand clamp 900. In some examples, the tie attachment 1300 is configured to cooperate with the fastener 310 to attach or secure the tie attachment 1300 to the long span strand clamp 900 or any other example long span strand clamp. In some installations, the tie attachment 1300 may be applied at the time of the original provision of the fiber optic cable 114 or wire 114. It is to be appreciated that the tie attachment 1300 can be introduced to the long span strand clamp 900 at a later time, such as during provision of a second fiber optic cable 114 or wire 114. The tie attachment 1300 can be used for slack management (e.g., to hold, support, store, etc. fiber, wire, etc. that is coiled and/or otherwise configured for potential subsequent deployment). The tie attachment 1300 can be used to attach or secure the long span strand clamp 900 to a second strand similar to or identical to strand 124. The tie attachment can be used to attach or secure a second fiber optic cable similar to or identical to the fiber optic cable 114 to the long span strand clamp 900. Still other examples may utilize the tie attachment 1300 for other purposes.

Referring to FIG. 15, the tie attachment 1300 includes a flat plate 1400 defining an aperture 1402. The aperture 1402 can cooperate or align with the apertures 1006, 1104 enabling the fastener 310 to pass through and secure the tie attachment 1300 to the long span strand clamp 900. An arm 1404 can be attached to and extend away from the flat plate 1400. In some examples, the arm 1404 can include a bend or define a right angle 1406. The arm 1404 can terminate at and be attached to a vertical wall 1408. The vertical wall 1408 can be configured to maintain the tie device 1410 in cooperation with the tie attachment 1300. FIG. 15 shows an example second strand or second fiber optic cable 1412 attached to the tie attachment 1300 with the tie device 1410, e.g., a wire tie.

Figures 16, 17:
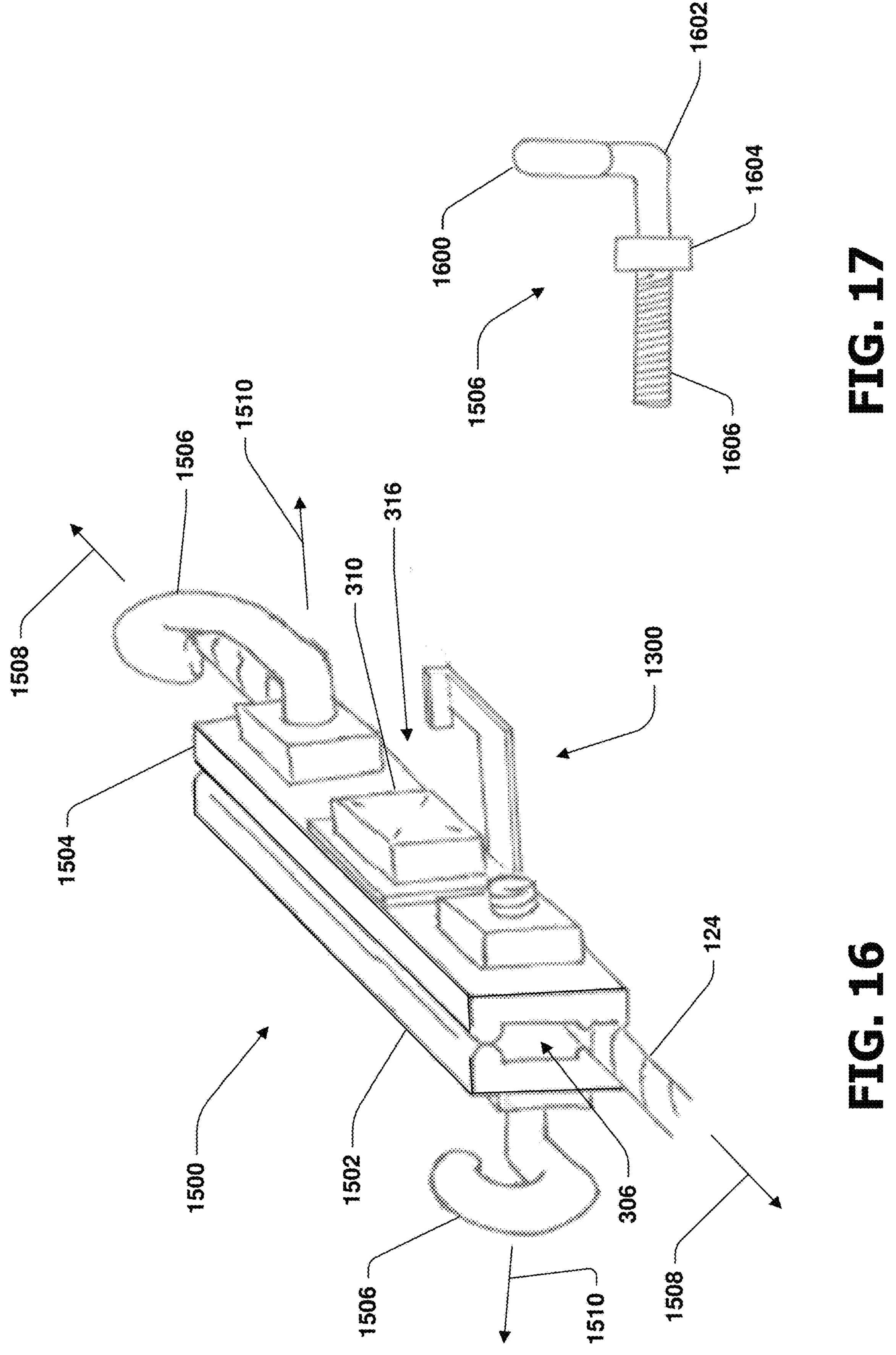
FIG. 16 is an isometric detail view of another example long span strand clamp that can be used in the environment shown in FIG. 1.
FIG. 17 is an orthographic detail view of a support portion of the long span strand clamp of FIG. 16.

Referring to FIG. 16, an isometric detail view of another example long span strand clamp 1500 is illustrated. The long span strand clamp 1500 includes a first clamp portion 1502, a second clamp portion 1504, and a support portion 1506. The tie attachment 1300 can be included as shown, secured to the long span strand clamp 1500 with the fastener 310 in the second position 316. In this exemplary long span strand clamp 1500, the strand 124 extends in a first direction 1508 when received within the opening 306 while the support portion 1506 extends away from at least one of the first clamp portion 1502 or the second clamp portion 1504 in a second direction 1510 oblique to the first direction 1508. Many of the conceptual and operational details of the long span strand clamp 1500 are similar to or are the same as those already described in regard to the long span strand clamps 300, 900.

Referring to FIG. 17, a detail view of the support portion 1506 of the long span strand clamp 1500 is illustrated. This support portion 1506 is a combination of example support portions and fasteners as described in regard to previous examples. As shown in FIG. 17, the support portion 1506 can include a curved first end 1600. The curved first end 1600 is configured to cooperate with other line support components. The support portion 1506 can include an angle 1602 (e.g., a right angle) connected to a larger diameter section 1604 that can include formed opposing flats for wrench application. The support portion 1506 can then terminate in a threaded section 1606 configured to cooperate with a typical hardware nut.

Figures 18, 19:
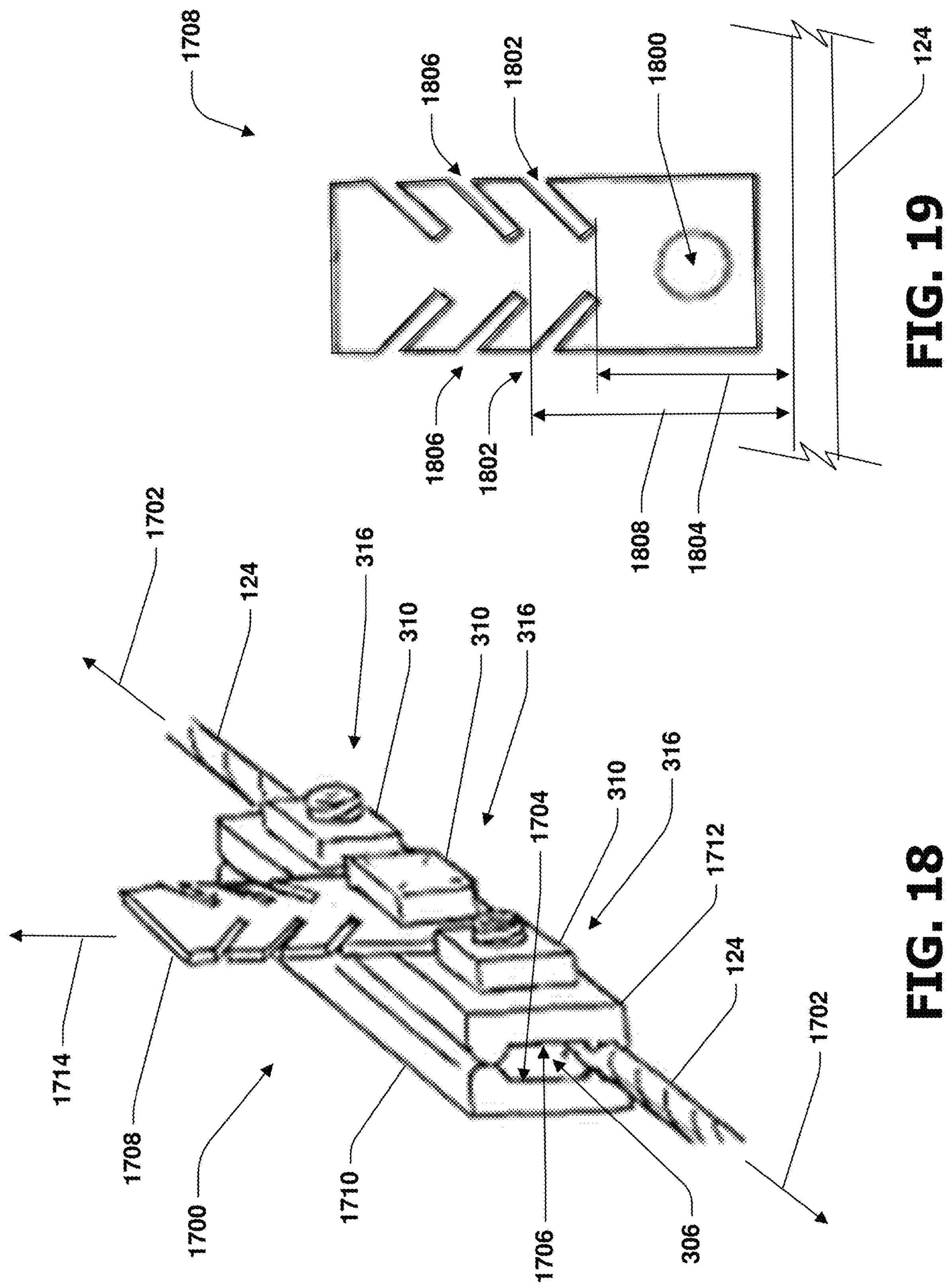
FIG. 18 is an isometric detail view of another example long span strand clamp that can be used in the environment shown in FIG. 1.
FIG. 19 is an orthographic detail view of a support portion of the long span strand clamp of FIG. 18.

Referring to FIG. 18, an isometric view of another example long span strand clamp 1700 is illustrated. Many of the conceptual and operational details of the long span strand clamp 1500 are similar to or are the same as those already described in regard to the long span strand clamps 300, 900, 1500, and many of those details are not repeated here. The strand 124 extends in a first direction 1702 when contacted by the first inner side 1704 and the second inner side 1706 for connection to the long span strand clamp 1700. The long span strand clamp 1700 includes a support portion 1708 that extends away from at least one of the first clamp portion 1710 or the second clamp portion 1712 in a second direction 1714 oblique to the first direction 1702.

Referring to FIG. 19, an orthographic detail view of a support portion 1708 of the long span strand clamp 1700 is illustrated. The support portion 1708 can be generally rectangular as shown, however, any suitable shape is satisfactory. The support portion 1708 can be constructed of any suitable material, however, the support portion 1708 may require a relatively strong material to withstand typical anticipated stress and strain values arising from constant tension of the associated wire supporting structures, weather effects, etc. The support portion 1708 defines an aperture 1800 configured to cooperate with companion apertures in the first clamp portion 1710 and the second clamp portion 1712, enabling the fastener 310 to pass through the aperture 1800 aligned with the apertures in the first clamp portion 1710 and the second clamp portion 1712.

The support portion 1708 defines a first slot 1802, or a first level of a pair of slots, located at a first distance 1804 from the strand 124. Similarly, the support portion 1708 defines a second slot 1806, or a second level of a pair of slots, located at a second distance 1808 from the strand 124. It is contemplated that the support structure 1708 can include at least one additional or perhaps several additional slots or pairs of slots in order to support one additional or several additional wires.

Figure 20:
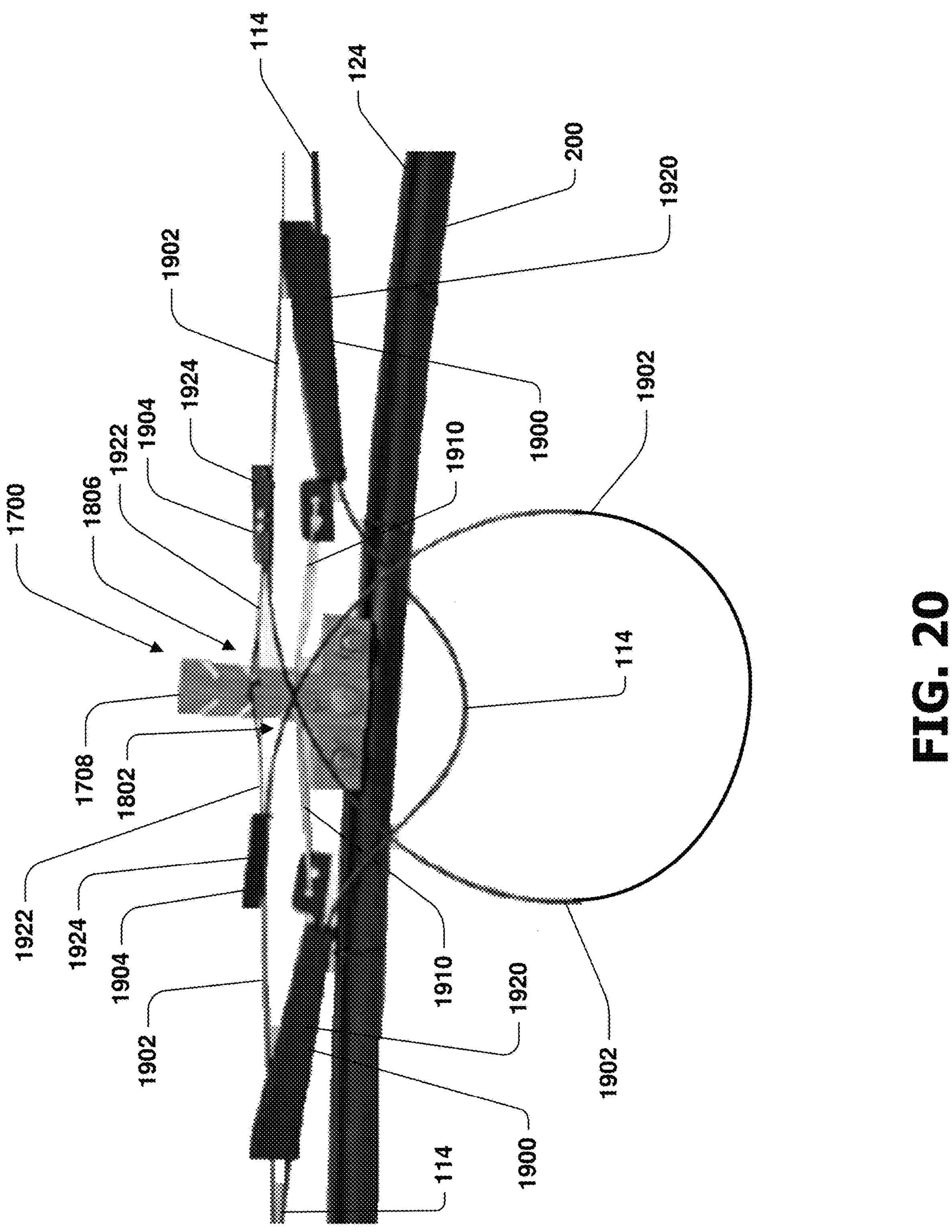
FIG. 20 is a detail view of the long span strand clamp of FIG. 18 used in the environment of FIG. 1 with two fiber optic cables and two sets of fiber drop clamps.

Referring to FIG. 20, a detail view of the long span strand clamp 1700 is illustrated. The long span strand clamp 1700 is shown supporting a first wire 114 in cooperation with two wire clamps or fiber drop clamps 1900 and a second wire 1902 in cooperation with two fiber drop clamps 1904. As previously discussed, the first wire 114 and the second wire can be fiber optic cables. The two fiber drop clamps 1900 can be two of the same type of fiber drop clamps. Similarly, the two fiber drop clamps 1904 can be two of the same type of fiber drop clamps. Of course, there may be fiber optic installations employing two or more various types of wires or fiber optic cables to be suspended through the strand while using various different wire clamps or fiber drop clamps.

As shown, the strand 124 is lashed to the cable 200 as previously described. The long span strand clamp 1700 is attached to the strand 124 as a result of the fastener(s) located in the second position. The first wire 114 is supported by or from the strand 124 via or through the long span strand clamp 1700. The support portion 1708 is attached to at least one of the first clamp portion 1710 or the second clamp portion 1712. The wire 114 is supported the first distance 1906 from the strand 124 via the long span strand clamp 1700 and the second wire 1902 is supported the second distance 1908. The second distance 1908 is different than the first distance 1906 (e.g., the second distance 1908 is greater than or longer than the first distance 1906).

As described, the first slot 1802 is configured to receive a portion of the wire clamp 1900 attached to the wire 114 from the right side as shown in FIG. 20. In some examples, the portion is a lanyard 1910 that is a part of the wire clamp 1900 and supports a tension force passing through the wire 114 from a utility pole, into the wire clamp body 1920, through the lanyard 1910, and into the long span strand clamp 1700 through the support portion 1708. The same is true for the left side of the long span strand clamp 1700. As such, there is little to no tension in the wire 114 between the pair of wire clamps 1900, and the wire 114 can include extra length in the form of a loop or bend as shown.

Similarly, the second slot 1806 is configured to receive a portion of the second wire clamp 1904 attached to the second wire 1902 from the right side as shown in FIG. 20. In some examples, the portion is a lanyard 1922 that is a part of the wire clamp 1904 and supports a tension force passing through the second wire 1902 from a utility pole, into the wire clamp body 1924, through the lanyard 1922, and into the long span strand clamp 1700 through the support portion 1708. The same is true for the left side of the long span strand clamp 1700. As such, there is little to no tension in the second wire 1902 between the pair of wire clamps 1904, and the second wire 1902 can include extra length in the form of a loop or bend as shown.

In summary, the strand 124 extends in a first direction when contacted by the first inner side 1704 and the second inner side 1706 for connection to the long span strand clamp 1700. The support portion 1708 is configured to cooperate with a first wire clamp 1900 located a third distance from the long span strand clamp 1700. Also, the support portion 1708 is configured to cooperate with a second wire clamp 1900 located a fourth distance from the long span strand clamp 1700. The third distance is taken along the first direction on a first side of the clamp (e.g., right side of the clamp in FIG. 20), and the fourth distance is taken along the first direction on a second side opposing the first side (e.g., the left side of the clamp in FIG. 20). As such, the wire 114 can be slack between the first wire clamp 1900 and the second wire clamp 1900.

Figure 21:
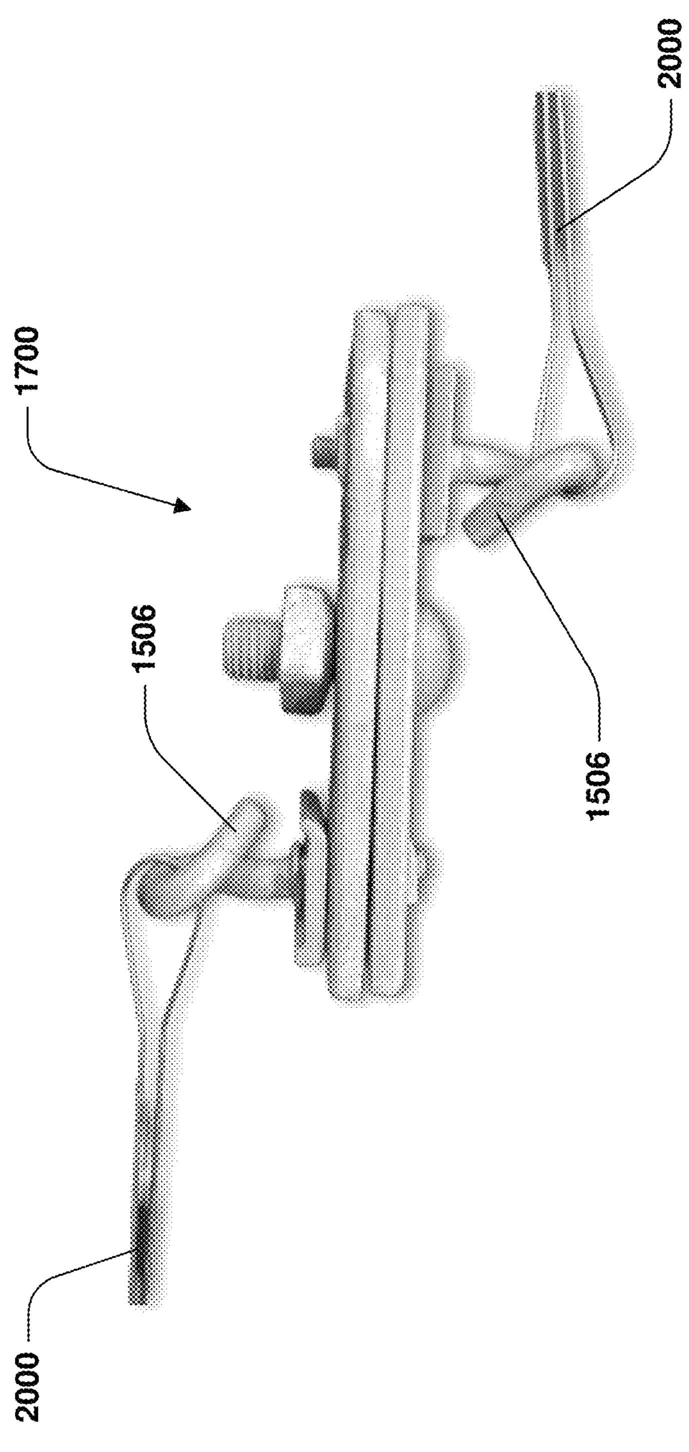
FIG. 21 is an orthographic detail view of the long span strand clamp of FIG. 16 showing a portion of fiber drop clamps attached to the support portions.

FIG. 21 is an orthographic detail view of the long span strand clamp 1500 showing a portion of fiber drop clamps (e.g., the wire clamps 1900) attached to the support portions 1506. In some examples, a lanyard 2000 that can be a portion of a fiber drop clamp 1900 extends from the fiber drop clamp 1900 and is looped around the support portion 1506 on each side of the long span strand clamp 1500. This connection is configured to transmit the loading forces from the wire 114 to the long span strand clamp 1500 such that the strand 124 can support the wire 114 at a midpoint between utility poles. Many of the other example long span strand clamps discussed herein operate in the same way whether the support portion extends parallel to the strand 124 or oblique to the strand 124.

A method for supporting the wire from the strand can include attaching a clamp to the strand and then attaching a first wire clamp to the wire on a first side of the clamp. Then the process can continue by attaching a second wire clamp to the wire on a second side of the clamp. An installer continues by securing the wire to the first wire clamp and the second wire clamp. Then, applying a first tension between the first wire clamp and the clamp can be attained by attaching the lanyard of a wire clamp to the support portion of a long strand support clamp. The application of a second tension between the second wire clamp and the clamp is then completed on the opposite side of the long span strand clamp by connecting a lanyard of another wire clamp to the support portion of the long span strand clamp. In some examples, the long span strand clamp can be attached to a second strand. In some examples, applying the first tension and applying the second tension includes applying the first tension and applying the second tension such that the wire is slack between the first wire clamp and the second wire clamp.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A clamp for supporting a wire from a strand, comprising:

a first clamp portion having a first inner side;

a second clamp portion having a second inner side, wherein:

an opening sized to receive the strand is defined between the first inner side and the second inner side when the first clamp portion is in proximity of the second clamp portion, and the first inner side and the second inner side contact the strand when the strand is received within the opening to connect the clamp to the strand, a support portion configured to support the wire and attached to at least one of the first clamp portion or the second clamp portion such that the wire is supported from the strand via the clamp; and a fastener configured to cooperate with the first clamp portion and the second clamp portion and movable from a first position to a second position, wherein:

the support portion and the strand both extend from a first end of the clamp to a second end of the clamp;

when the fastener is in the first position, the first inner side is separated from the second inner side by a first distance to facilitate relative motion between the strand and at least one of the first clamp portion or the second clamp portion, and when the fastener is in the second position, the fastener is separated from the support portion, and the first inner side is separated from the second inner side by a second distance less than the first distance to inhibit the relative motion between the strand and at least one of the first clamp portion or the second clamp portion.

2. The clamp of claim 1, wherein:

the strand extends in a first direction when received within the opening; and the support portion extends away from at least one of the first clamp portion or the second clamp portion in a second direction parallel to the first direction.

3. The clamp of claim 1, wherein:

the strand extends in a first direction when received within the opening; and the support portion extends away from at least one of the first clamp portion or the second clamp portion in a second direction oblique to the first direction.

4. The clamp of claim 1, wherein a portion of the support portion is located between the first clamp portion and the second clamp portion such that when the fastener is in the second position at least one of the first clamp portion or the second clamp portion apply a force to the portion of the support portion to inhibit relative motion between the support portion and at least one of the first clamp portion or the second clamp portion.

5. The clamp of claim 1, wherein a portion of the support portion is fixedly attached to at least one of the first clamp portion or the second clamp portion to inhibit disengagement of the support portion from at least one of the first clamp portion or the second clamp portion.

6. The clamp of claim 1, wherein:

the strand extends in a first direction when received within the opening, a second opening sized to receive the support portion is defined between the first inner side and the second inner side when the first clamp portion is in proximity of the second clamp portion, and the support portion extends in a second direction different than the first direction when received within the second opening.

7. The clamp of claim 1, wherein at least one of the first inner side or the second inner side includes a non-uniform surface configured to limit the relative motion between the strand and at least one of the first clamp portion or the second clamp portion.

8. The clamp of claim 1, wherein the opening is at least partially defined in a first flat surface of the first inner side such that the first flat surface contacts the strand when the strand is received within the opening.

9. The clamp of claim 8, wherein the opening is at least partially defined in a second flat surface of the second inner side such that the second flat surface contacts the strand when the strand is received within the opening.

10. The clamp of claim 1, comprising a hinge attached to the first clamp portion and to the second clamp portion wherein:

the hinge is in a first orientation when the first inner side and the second inner side are separated by the first distance, and the hinge is in a second orientation when the first inner side and the second inner side are separated by the second distance.

* * * * *